DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 6

T952,003

POLYESTER/ACRYLIC LOOP PILE FABRIC

Joseph M. Perri, Wilmington, Del., assignor to E. I. du Pont de Nemours & Company, Wilmington, Del.

Filed Sept. 22, 1975, Ser. No. 615,496

Int. Cl.[2] D03D *27/00;* D04H *11/00*

U.S. Cl. 428—97

No Drawing. 9 Pages Specification

Loop pile carpets produced from a blend of acrylic fibers with a small proportion of polyester fibers are flame resistant and much more durable than corresponding all-acrylic carpets, said blend is compound of 60 to 80 weight percent of acrylonitrile polymer staple fibers having a denier per filament of 12 to 18, and 40 to 20 weight percent of polyethlene terephthalate staple fibers having a denier per filament of 12 to 18.